United States Patent
Sethi et al.

(10) Patent No.: US 12,289,221 B1
(45) Date of Patent: Apr. 29, 2025

(54) MONITORING OPERATION OF EDGE DATACENTER DEVICES

(71) Applicant: Dell Products L.P., Round Rock, TX (US)

(72) Inventors: Parminder Singh Sethi, Ludhiana (IN); Shree Rathinasamy, Round Rock, TX (US); Anay Kishore, Bangalore (IN); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/487,244

(22) Filed: Oct. 16, 2023

(51) Int. Cl.
*H04L 43/026* (2022.01)
*H04L 43/04* (2022.01)
*H04L 43/065* (2022.01)
*H04L 67/2895* (2022.01)

(52) U.S. Cl.
CPC ............ *H04L 43/065* (2013.01); *H04L 43/04* (2013.01); *H04L 67/2895* (2013.01)

(58) Field of Classification Search
CPC ... H04L 43/065; H04L 43/04; H04L 67/2895; H04L 43/026; H04L 43/62
USPC ......................................................... 709/224
See application file for complete search history.

(56) References Cited

U.S. PATENT DOCUMENTS

| | | | |
|---|---|---|---|
| 2019/0102732 A1* | 4/2019 | Sauerwein, Jr. ... | G06Q 10/0833 |
| 2020/0241482 A1* | 7/2020 | Sinha .................... | G05B 15/02 |
| 2021/0174347 A1* | 6/2021 | Rose .................... | H04L 63/0428 |
| 2022/0292346 A1* | 9/2022 | Mimassi ................. | G06F 40/30 |
| 2023/0006904 A1* | 1/2023 | Kommula ........... | H04L 43/0852 |
| 2023/0010247 A1* | 1/2023 | Kumar ................ | H04L 12/1886 |

OTHER PUBLICATIONS

Progress Software Corporation, "SNMP Trap Receiver," https://www.whatsupgold.com/snmp/snmp-trap-receiver, Accessed Oct. 14, 2023, 2 pages.
M. Rouse, "Hop," https://www.techopedia.com/definition/2411/hop, Apr. 23, 2018, 9 pages.
Phoenix NAP, "What is a Web Client?" https://phoenixnap.com/glossary/web-client#:~:text=A, Accessed Oct. 5, 2023, 2 pages.
Strong DM, "Forward Proxy vs. Reverse Proxy: The DifferenceExplained," https://www.strongdm.com/blog/difference-between-proxy-and-reverse-proxy, Accessed Oct. 5, 2023, 15 pages.
K. Yasar et al., "Network Switch," https://www.techtarget.com/searchnetworking/definition/switch?Offer=abMeterCharCount_var3, Accessed Oct. 9, 2023, 8 pages.
Cloudfare, "What is a Network switch? Switch vs. Router," https://www.cloudflare.com/learning/network-layer/what-is-a-network-switch/, Accessed Oct. 9, 2023, 6 pages.

* cited by examiner

*Primary Examiner* — Jude Jean Gilles
(74) *Attorney, Agent, or Firm* — Ryan, Mason & Lewis, LLP (57) ABSTRACT

A method comprises monitoring operation of one or more devices of an edge platform, collecting data corresponding to the operation of the one or more devices, and transmitting the data corresponding to the operation of the one or more devices over at least one communications network, via a first server, to a second server. The steps of the method are executed by a processing device operatively coupled to a memory. The processing device is a component of a network switch located in the edge platform.

20 Claims, 7 Drawing Sheets

MONITORING OPERATION OF EDGE DATACENTER DEVICES

FIELD

The field relates generally to information processing systems, and more particularly to monitoring the operation of edge datacenter devices.

BACKGROUND

To keep platforms in an operational state, it is necessary that the availability of related technological services and applications is maintained. High availability of applications and services can be achieved if the related infrastructure is continuously functional.

Technological infrastructures include several types of devices tied together in a logical manner. The devices include, for example, servers, storage devices, networking ecosystems, etc. To provide better reliability of underlying device infrastructures, there is a need to monitor the devices for errors and/or issues.

SUMMARY

Embodiments provide techniques for monitoring edge datacenter devices in an information processing system.

For example, in one embodiment, a method comprises monitoring operation of one or more devices of an edge platform, collecting data corresponding to the operation of the one or more devices, and transmitting the data corresponding to the operation of the one or more devices over at least one communications network, via a first server, to a second server. The steps of the method are executed by a processing device operatively coupled to a memory. The processing device is a component of a network switch located in the edge platform.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous, and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

Figure 1:
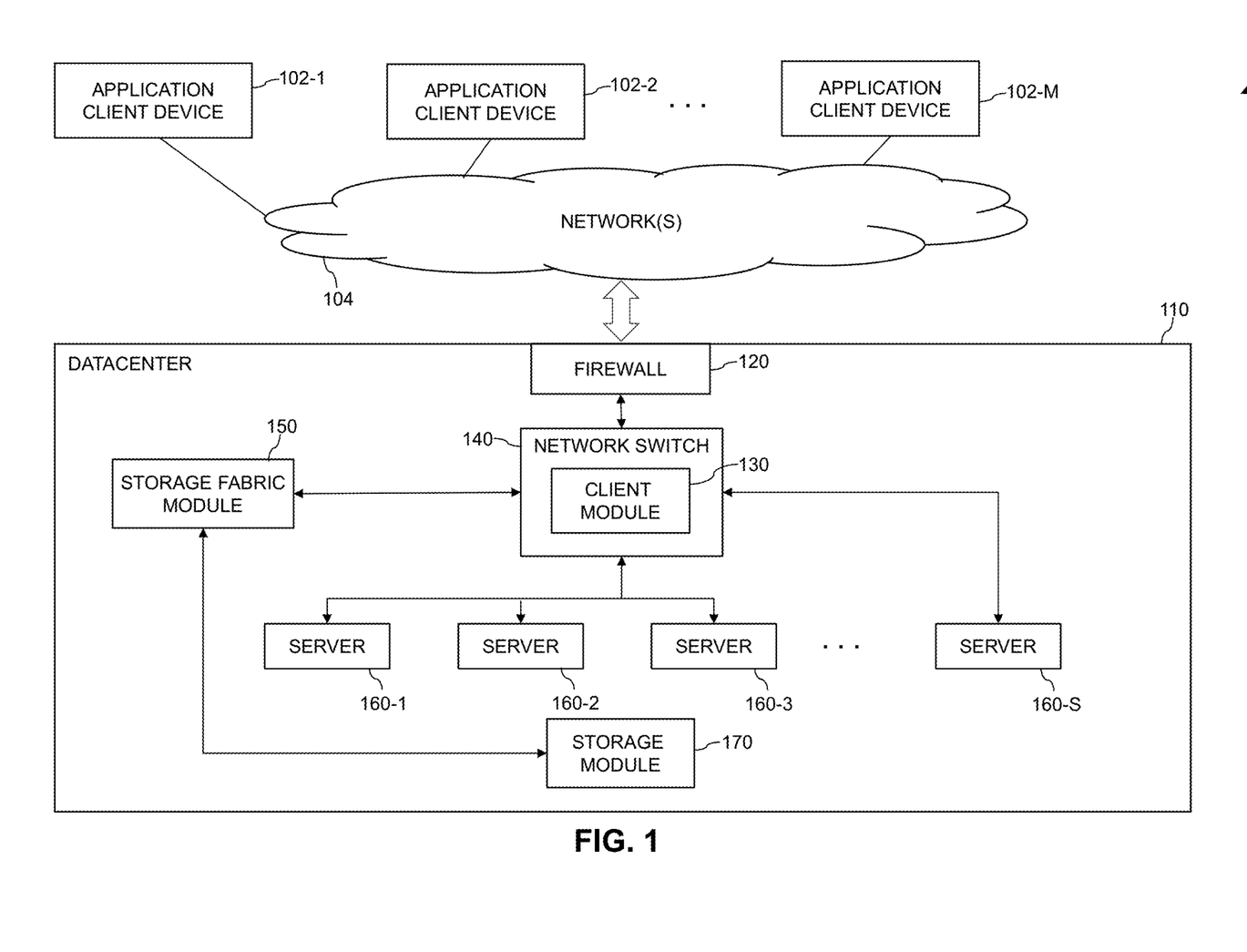
FIG. 1 depicts an information processing system with an edge datacenter including a client module configured to monitor operation of edge datacenter devices in an illustrative embodiment.

FIG. 1 shows an information processing system 100 configured in accordance with an illustrative embodiment.

The information processing system 100 comprises application client devices 102-1, 102-2, . . . 102-M (collectively "application client devices 102"). The application client devices 102 communicate over a network 104 with a datacenter 110. The variable M and other similar index variables herein such as K, L, N and S are assumed to be arbitrary positive integers greater than or equal to one.

The application client devices 102 can comprise, for example, Internet of Things (IoT) devices, desktop, laptop or tablet computers, mobile telephones, or other types of processing devices capable of communicating with the datacenter 110 over the network 104. Such devices are examples of what are more generally referred to herein as "processing devices." Some of these processing devices are also generally referred to herein as "computers." The application client devices 102 may also or alternately comprise virtualized computing resources, such as virtual machines (VMs), containers, etc. The application client devices 102 in some embodiments comprise respective computers associated with a particular company, organization or other enterprise. In illustrative embodiments, the application client devices 102 execute client-side applications used for connecting to the datacenter 110 and one or more servers 160-1, 160-2, 160-3, . . . 160-S(collectively "servers 160") of the datacenter 110 over the network 104. A non-limiting example of a client-side application is a web browser or web application which, for example, displays web pages received from the servers 160 and allows users to interact with the servers 160.

The terms "user" or "client" herein are intended to be broadly construed so as to encompass numerous arrangements of human, hardware, software or firmware entities, as well as combinations of such entities. Operational data monitoring and collection services may be provided for users utilizing one or more machine learning models, although it is to be appreciated that other types of infrastructure arrangements could be used. At least a portion of the available services and functionalities provided by the datacenter 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the datacenter 110, as well as to support communication between the datacenter 110 and connected devices (e.g., application client devices 102) and/or other related systems and devices not explicitly shown.

An edge computing architecture moves at least a portion of data processing to the periphery of a network to be closer to a data source rather than to a centralized location. For example, requests for application services and data from clients may be satisfied by one or more servers from one or more edge datacenters. In illustrative embodiments, the datacenter 110 is an edge datacenter. An edge datacenter is located at an edge computing site. An edge computing site may comprise one or more edge stations or other types and arrangements of edge nodes. An edge computing site illustratively comprises a plurality of edge devices. Each such node of an edge computing site comprises at least one processing device that includes a processor coupled to a memory. An edge computing site illustratively executes at least portions of various workloads for system users. Such workloads may comprise one or more applications. An example edge computing site comprises a set of edge compute, storage and/or network resources. A given such set of edge resources illustratively comprises at least one of compute, storage and network resources of one or more edge devices of the corresponding edge computing site.

Edge compute resources of the edge computing site can include, for example, various arrangements of processors, possibly including associated accelerators. Edge storage resources of the edge computing site can include, for example, one or more storage systems or portions thereof that are part of or otherwise associated with the edge computing site. A given such storage system may comprise, for example, all-flash and hybrid flash storage arrays, software-defined storage systems, cloud storage systems, object-based storage systems, and scale-out distributed storage clusters. Combinations of multiple ones of these and other storage types can also be used in implementing a given storage system in an illustrative embodiment. Edge network resources of the edge computing site can include, for example, resources of various types of network interface devices providing particular bandwidth, data rate and communication protocol features.

If there are certain issues occurring with hardware and/or software in an edge datacenter that is hosting a critical application and the issues are not monitored and/or go unchecked, this may lead to unavailability of the hardware and/or software and failure of the application to provide its corresponding services. With the number of edge datacenters and hosting platforms increasing worldwide, it is becoming increasingly difficult for enterprises to track operation of and support the datacenter devices. For example, the depending on their location, the datacenters can have different types of devices and different policies and standards for operation. Additionally, there are technical problems with analyzing operational data of datacenter devices from thousands of locations worldwide and/or millions of datacenter devices that may have unique operational requirements.

In an attempt to address the above technical problems, the illustrative embodiments advantageously provide a client module locally deployed in each datacenter that is configured to monitor the operation of edge datacenter devices and collect operational data, including data indicating errors, failures and potential failures of the edge datacenter devices and their components. As an additional advantage, the client module is configured to automatically transmit the collected data to backend server, which can automatically trigger remedial actions (e.g., create technical support cases and initiate replacement parts transfers to the edge datacenters based on the received data). In an effort to alleviate the burden on backend server resources, the embodiments advantageously provide for intermediate zone/area-based local content delivery network (CDN) servers which are respectively connected between the backend servers and one or more edge datacenters within the same zone/area. The CDN servers process and filter the operational data before sending it to the backend servers and process and filter the responses by the backend servers before sending the responses to the corresponding client modules.

As an additional advantage, the backend servers leverage machine learning techniques to analyze the received operational data, identify one or more issues with the edge devices and trigger the remedial actions. Based on the identified issues and remedial actions, the backend servers send updated policies, rules and/or conditions for the collection and monitoring of operational data of the edge datacenter devices by the corresponding client modules. The updated policies, rules and/or conditions are sent from the backend servers to the client modules via the CDN servers, which can filter and/or modify the updated policies, rules and/or conditions to conform to regional restrictions, regional device types and/or regional service level agreements (SLAs) for the corresponding client modules.

Referring back to FIG. 1, the datacenter 110 in the present embodiment is assumed to be accessible to the application client devices 102 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols. The networks may comprise Internet Protocol version 6 (IPv6) and Internet Protocol version 4 (IPv4) configured networks. As explained in more detail herein, client modules are configured to be generic with respect to IP protocol to work with IPv4 and IPV6. For example, client modules can process the operational data of the edge device and perform other functions regardless of whether applications are ported from IPv4 to IPv6 or vice-versa.

Some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the datacenter 110 includes a firewall 120, a network switch 140, a client module 130 within the network switch 140, a storage fabric module 150, servers 160 and a storage module 170. The network switch 140, including the client module 130, is connected between the firewall 120 and the remaining components of the datacenter 110. The firewall 120 provides a level of network security for the datacenter 110 to and from an external network by monitoring incoming and outgoing network traffic. The firewall 120 determines whether to allow or block specific traffic based on a defined set of security rules. The firewall 120 functions as a barrier between trusted, secured and controlled internal networks and untrusted outside networks. The firewall 120 can comprise, for example, hardware and/or software.

The network switch 140 determines where (e.g., which one of the servers 160) to send incoming message frames based on, for example, media access control (MAC) address. In some embodiments, the network switch 140 maintains tables that match each MAC address to a corresponding port receiving the MAC address. In illustrative embodiments, the network switch 140 operates on the data-link layer, or Layer 2, of the Open Systems Interconnection (OSI) model. The network switch 140 can be a hardware device, software-based virtual device or combination thereof. As explained in more detail herein, the network switch 140 comprises the client module 130 as a component thereof.

The network switch 140 is connected to a storage fabric module 150. The storage fabric module 150 comprises software configured to provide high-speed shared storage for elements (e.g., client module 130, servers 160, etc.) of the datacenter 110. The storage fabric module 150 is connected to a storage module 170 comprising one or more storage devices. The storage devices comprise one or more of various types of storage devices such as hard-disk drives (HDDs), solid-state drives (SSDs), flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the storage module 170. In this regard, the term "storage device" as used herein should be broadly construed to encompass all types of persistent storage media including hybrid drives.

Figure 2:
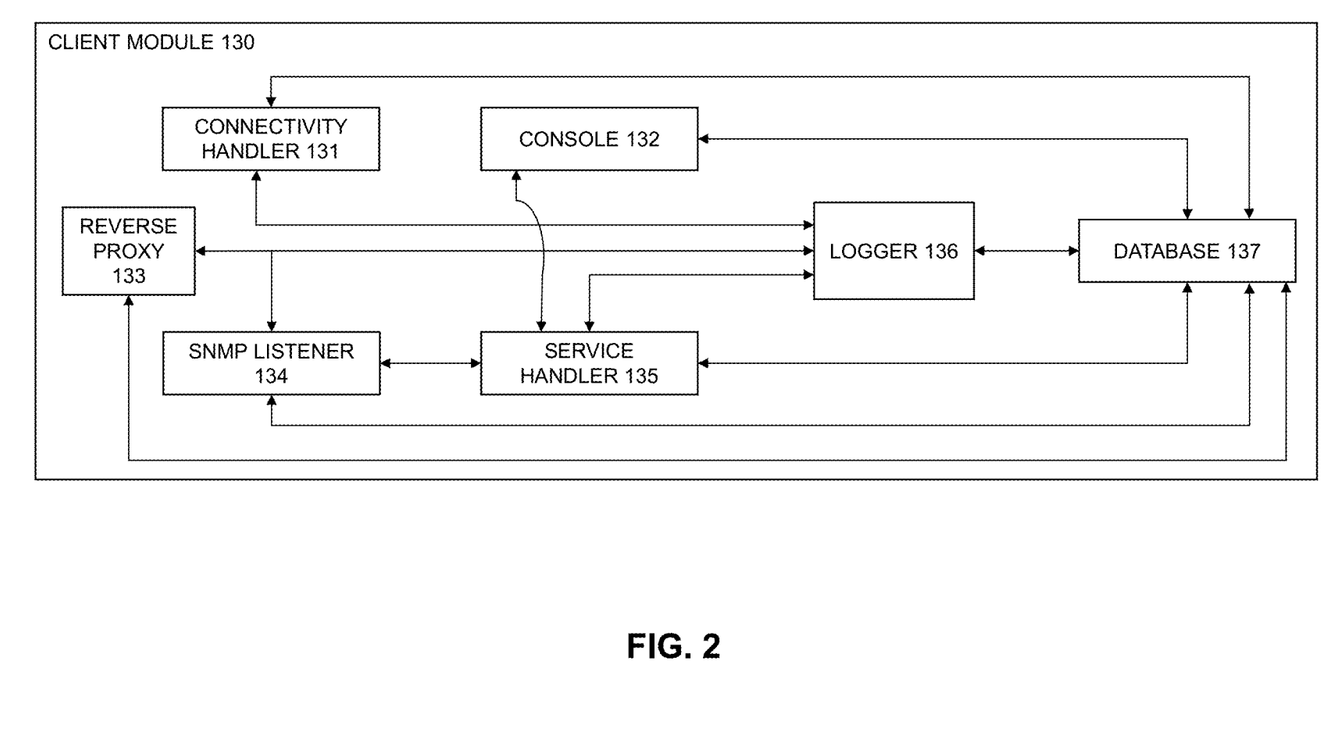
FIG. 2 depicts a block diagram of components of a client module configured to monitor operation of edge datacenter devices in an illustrative embodiment.

Referring to FIGS. 1 and 2, the client module 130, which is a component of the network switch 140, comprises a connectivity handler 131, a console layer 132, a reverse proxy layer 133, a simple network management protocol (SNMP) listener 134, a service handler 135, a logger 136 and a database 137. The client module 130 is located in the datacenter 110, more specifically, in the network switch 140 and is configured to enhance the functionality of the network switch 140 used within an edge datacenter. In illustrative embodiments, the client module 130 comprises a lightweight application with the functionalities associated with the connectivity handler 131, the console layer 132, the reverse proxy layer 133, the SNMP listener 134, the service handler 135, the logger 136 and the database 137. The application may run in a container (e.g., Docker, Linux container (LXC) or other type of container) on the network switch 140, whereby the application is created in a container with code to enable the functionalities of the connectivity handler 131, the console layer 132, the reverse proxy layer 133, the SNMP listener 134, the service handler 135, the logger 136 and/or the database 137. The client module 130 works as an edge computing client sitting near the servers 160 where web applications and/or other applications are deployed. As explained in more detail in connection with FIGS. 3 and 4, clusters of client modules are connected with respective CDN servers, which will be deployed on a zone basis based on the volume of required support. A client module 130 monitors the devices and components of its corresponding datacenter 110 (e.g., the network switch 140, storage fabric module 150, servers 160, storage module 170 and other datacenter devices and/or components) for failures, alerts and/or errors.

Figure 3:
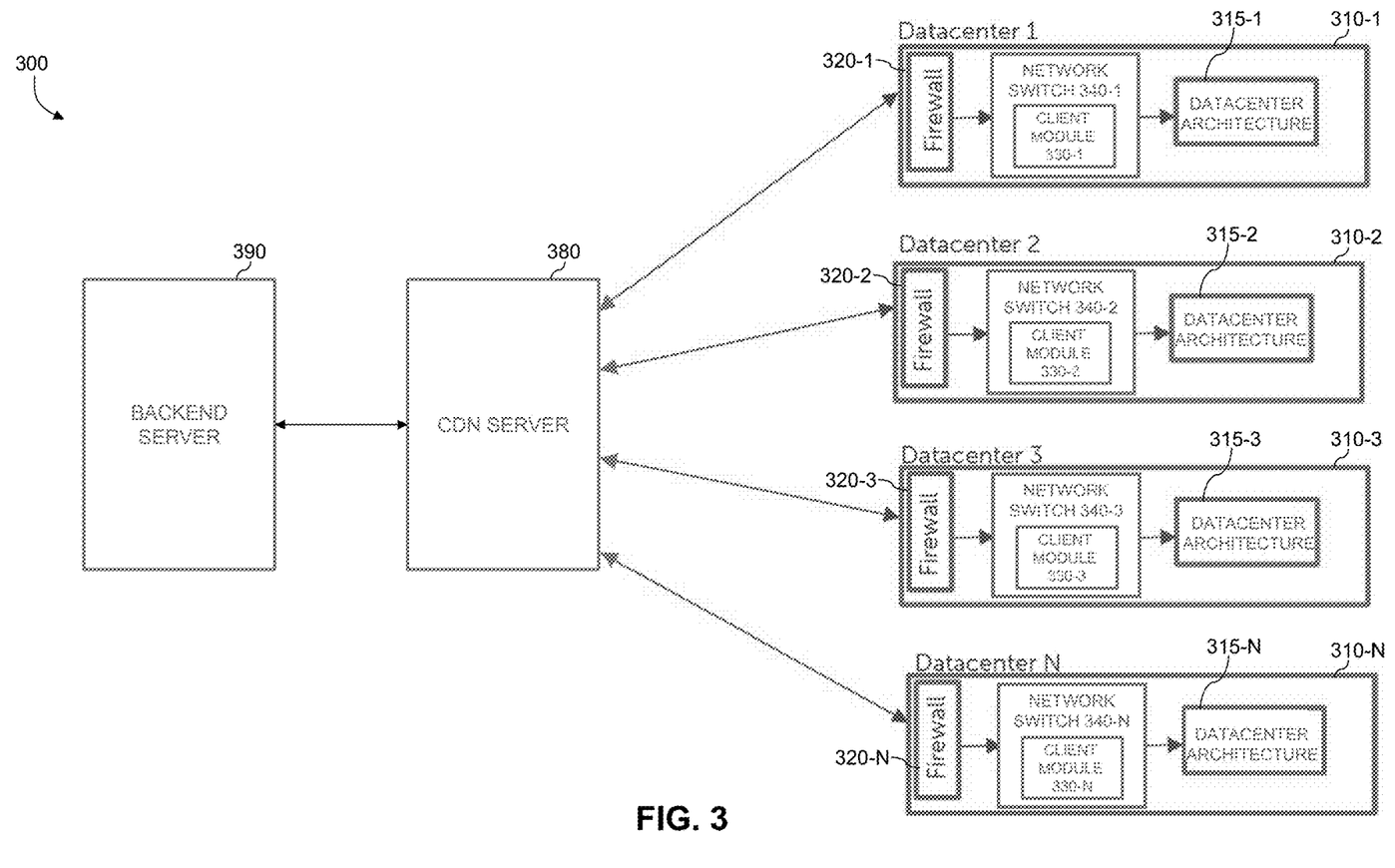
FIG. 3 depicts an architecture including multiple edge datacenters and corresponding client modules configured to monitor operation of edge datacenter devices in an illustrative embodiment.
Figure 4:
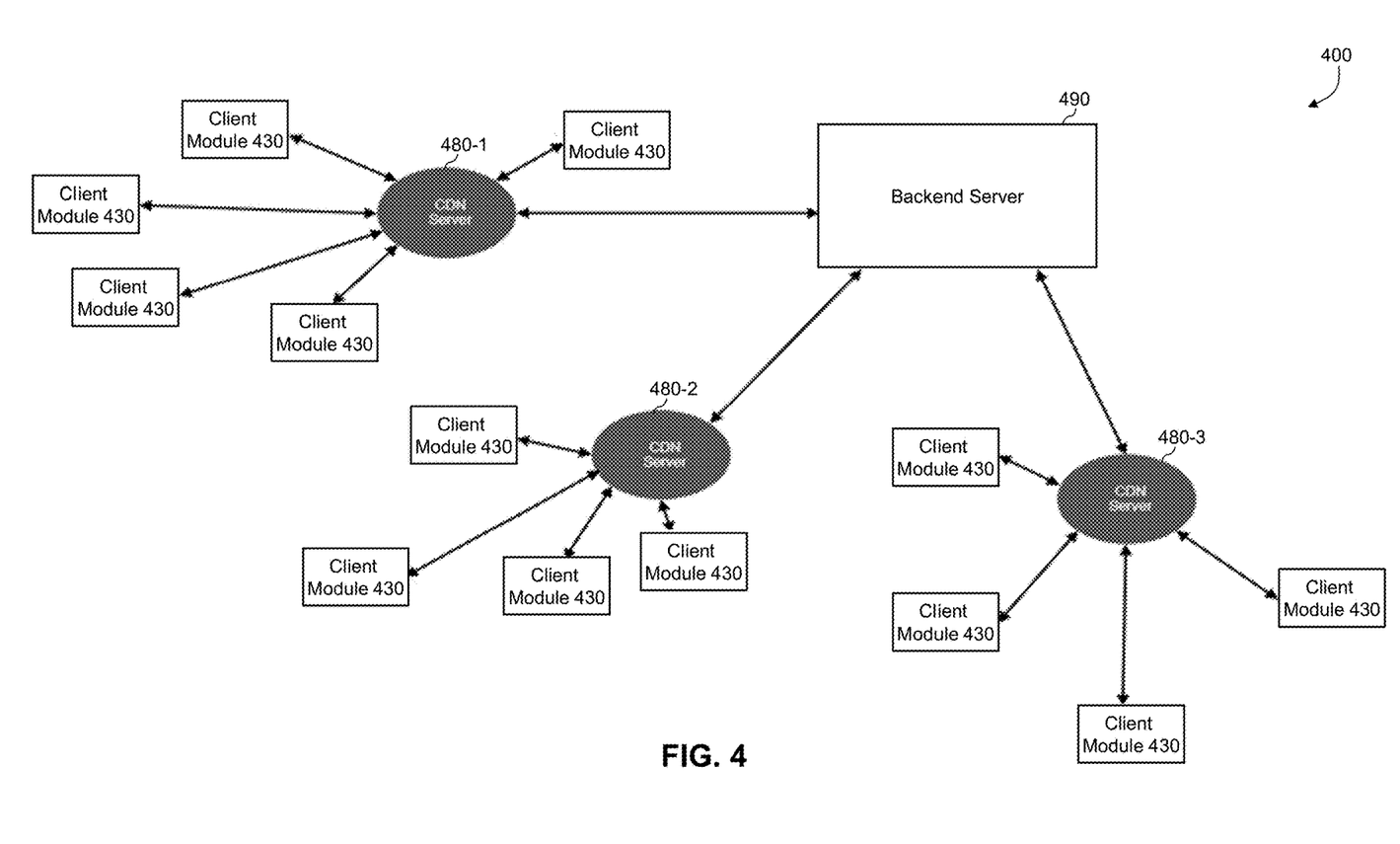
FIG. 4 depicts an architecture including multiple edge client modules connected to a backend server through respective content delivery network (CDN) servers in an illustrative embodiment.

In illustrative embodiments, the client module 130 is deployed in the datacenter 110 (e.g., customer datacenter) as part of the network switch 140. Referring, for example, to FIG. 3, respective ones of a plurality of client modules 330-1, 330-2, 330-3, . . . , 330-N(collectively "client modules 330") are deployed in respective ones of a plurality of network switches 340-1, 340-2, 340-3, . . . , 340-N(collectively "network switches 340") in respective ones of a plurality of datacenters 310-1, 310-2, 310-3, . . . , 310-N (collectively "datacenters 310"). Each network switch 340 is deployed between a corresponding one of a plurality of firewalls 320-1, 320-2, 320-3, . . . , 320-N(collectively "firewalls 320") and a corresponding datacenter architecture of a plurality of datacenter architectures 315-1, 315-2, 315-3, . . . , 315-N(collectively "datacenter architectures 315"). The datacenters 310, firewalls 320, client modules 330 and network switches 340 are the same as or similar to the datacenter 110, firewall 120, client module 130 and network switch 140. The datacenter architectures 315 correspond to the remaining components of a corresponding datacenter 310 including, for example, a storage fabric module (e.g., storage fabric module 150), servers (e.g., servers 160) and a storage module (e.g., storage module 170). FIG. 4 also illustrates multiple client modules 430, which are the same as or similar to the client modules 130/330.

Referring to FIG. 3, an architecture 300 includes a plurality of datacenters 310 including respective client modules 330 and network switches 340 connected to a CDN server 380, which is connected to a backend server 390. Similarly, FIG. 4 shows an architecture 400 with multiple client modules 430 respectively connected to CDN servers 480-1, 480-2 and 480-3 (collectively "CDN servers 480"). The CDN servers 480 are connected to backend server 490. The CDN servers 480 are configured the same as or similar to the CDN server 380. The backend server 490 is configured the same as or similar to the backend server 390. The CDN servers 380/480 provide local support for client modules 330/430 (and client module 130) and are deployed on a zone level (e.g., continent/region/area based). As the number of clients can be high, it will take large amounts of processing time for all client modules 130/330/430 to directly communicate with a backend server 390/490. To avoid this, intermediate CDN servers 380/480 are deployed at a reachable limit for faster access to services by the client modules 130/330/430. Data monitoring, collection and transmission policies generated by the backend servers 390/490 can be stored at the local CDN servers 380/480. Different types of operational data (e.g., performance metrics, alerts or notifications of device or component errors or other issues, logs and/or sensor data), can be uploaded from the client modules 130/330/430 to the CDN servers 380/480, and will further be uploaded to the backend servers 390/490 for additional processing and generation of enhanced definitions, policies and and/or rules for data monitoring, collection and transmission.

The backend servers 390/490 will be located at a backend (e.g., of an enterprise) and function as a central service provider for all of the CDN servers 380/480. The backend servers 390/490 obtain large amounts of data as uploads from the CDN servers 380/480 and process the data.

In illustrative embodiments, the client module 130/330/430 further comprises an onboard graphics processing unit (GPU) (not shown) to which datacenter monitoring related tasks can be offloaded. The onboard GPU can accommodate extra processing needs due to large amounts of operational data and monitoring efforts. The client module 130/330/430 maintains an inventory of devices and components within the datacenter 110/310 and monitors the devices and components using different methods such as, but not necessarily limited to, SNMP techniques, retrieval and analysis of sensor data from sensors associated with the devices and/or components and/or error logging (e.g., logging of alerts, notifications and/or errors generated by the devices and/or components), etc. In illustrative embodiments, sensors are part of the devices or components being monitored and may include, but are not necessarily limited to, temperature sensors, fan speed sensors or other sensors that might indicate hardware issues or problems. For example, temperature sensors may indicate temperatures above a designated threshold identifying issues with device operation causing unwanted heat generation. Based on the readings of different sensors, SNMP traps are triggered by system firmware when the readings are above a designated threshold.

The SNMP traps are captured by the SNMP listener 134, which is an SNMP trap receiver, and processed as errors. The client module 130/330/430 is configured to process collected operational data and alerts from the datacenter devices and/or components and send the collected operational data and alerts to a CDN server 380/480 for further processing.

The client module 130/330/430 comprises a logical module within a network switch 140/340 in form of a containerized application. In illustrative embodiments, the client module 130/330/430 is managed by users with appropriate access levels.

The connectivity handler 131 tracks the network connectivity of the devices and/or components of the datacenter 110/310 and of the CDN servers 380/480. The console layer 132 provides command-based management and a reporting interface for client modules 130/330/430. For example, errors will be shown in the reporting interface in case of any connectivity issues uncovered by the connectivity handler 131.

The reverse proxy layer 133 of the client module 130 (or 330/430) permits the client module function as a hop between a security system (e.g., firewall) and devices within the datacenter 110/310. As used herein, a "hop" refers to the path when a data packet is passed from one network element to another network element. For example, hops may respectively correspond to the number of devices that a data packet passes through from a source to a destination. The client modules 130/330/430 function as a hop between a security system and web applications running in a datacenter (e.g., datacenter 110 or 310). Advantageously, unlike conventional approaches, the client modules 130/330/430 add a layer of security in a datacenter (e.g., datacenter 110 or 310).

The reverse proxy layer 133 receives one or more data packets corresponding to at least one request for at least one service from an application client device 102. The service request is for a service (e.g., web service) from the one or more devices (e.g., servers 160) of the datacenter 110/310. The reverse proxy layer 133 scans the one or more data packets to validate the at least one request by determining whether the at least one request complies with one or more reverse proxy rules. The reverse proxy layer 133 filters incoming requests based on rules for incoming data traffic. The rules can be designated by, for example, the owner of the datacenter 110 and can correspond, but are not necessarily limited to, protocol, port, security level, data packet size and/or data packet component size, and/or approved or blocked source devices, APIs, calls, IP patterns and/or configurations. For example, the client module 130/330/430 can be configured with designated APIs of designated web services, application services, database services and other services that users will be calling. For example, there might be APIs which are required to be used within the datacenter 110/310, and any non-designated APIs or calls thereto can be blocked. The reverse proxy layer 133 filters the requests to the servers 160.

The SNMP listener 134 listens for SNMP alerts from the devices and/or components of a datacenter 110/310 and will process the SNMP alerts based on designated policies. For example, the SNMP listener 134 or other data collection component will continuously, periodically or at designated times monitor and collect operational data of the datacenter devices and upload the collected data to a CDN server 380/480. The collected data is transmitted to a backend server 390/490 for further analysis, predictions using machine learning and generation of automated remedial actions.

According to illustrative embodiments, the collected operational data relates to the health of the datacenter servers (e.g., servers 160), of storage devices and/or components (e.g., storage fabric module 150, storage module 170) and of networking devices (e.g., network switches 140/340) for changes in performance metrics (e.g., decreases in input-output operations per second (IOPS) and throughput, increases in latency, etc.) to eliminate downtime before it occurs. Operational data may be automatically collected by the SNMP listener 134 or other data collection component responsive to one or more events, and through scheduled collections.

The operational data collected by the SNMP listener 134 or other data collection component includes, but is not necessarily limited to, server OpenManage (OM) logs, operating system (OS) utilization data, server integrated Dell® remote access controller (iDRAC) logs, server hardware configuration data, OS event logs, PowerEdge™ RAID Controller (PERC TTY) logs, debug logs, application data and storage logs. The SNMP listener 134 or other data collection component collects live and historical data, which includes, for example, system information, storage logs, OS and application data, basic input-output system (BIOS) serial logs and debug logs. The BIOS serial logs can be collected using secure shell (SSH) protocol. Such logs may be captured by the logger 136.

Some example log entries prior to failure of a datacenter device or component include reference to, for example, an error-correcting code (ECC), device reset, aborted operations, failure of a highly available sync pool, a triggered watchdog, crashes, failure of background initialization (BGI), a corrupted consistency check (CC), request time outs, network bounces, etc. Other example log entries, which may be related to device or component failure, specify, for example, out of memory, network table full-dropping packet, call traces, unsupported bits, etc. Some of the references may be extracted from error messages or sensors. Reasons for device or component failure may be detectable by the machine learning algorithms of the backend servers 390/490 in clusters of log instances (e.g., errors, exceptions, critical log entries, etc.) across multiple logs received from the client modules 130/330/430 via corresponding CDN servers 380/480.

The service handler 135 processes web services. For example, the service handler 135 processes web/applications before being shared with the remaining components of the datacenter (e.g., datacenter architecture 315). For example, the service handler 135 performs starting, stopping and restarting of client module services, monitors services and logs appropriate messages about the services in the logger 136.

A logger 136 logs the alerts and operational data in connection with the devices and/or components of the datacenter 110/310, and logs activities, events, processes of the components of the client modules 130/330/430 (e.g., connectivity handler 131, the console layer 132, the reverse proxy layer 133, the SNMP listener 134 and the service handler 135) of the client modules 130/330/430, and of the devices and components of the datacenter 110/310 (e.g., the network switch 140, storage fabric module 150, servers 160, storage module 170 and other datacenter devices and/or components). The logger 136 also logs performance of services and applications in the datacenter 110/310 and maps request details to sources and destinations. The logs are uploaded to the backend servers 390/490 via the CDN servers 380/480. Analysis of the logs by the backend servers 390/490 using machine learning techniques performed by the backend servers 390/490 and used by the backend servers 390/490 to generate updated policies for processing collected operational data by the client modules 130/330/430. The client modules 130/330/430 will have a defined set of policies to process error or failure alerts from datacenter devices and/or components. These policies will be generated at backend servers 390/490 and passed through CDN servers 380/480. The policies will be updated at different times based on updated machine learning by backend servers 390/490.

For example, the backend servers 390/490 use one or more machine learning algorithms to analyze data corresponding to the operation of the one or more datacenter devices and based at least in part on the analysis, predict one or more issues with the one or more devices. The backend servers 390/490 generate one or more policies regarding processing of the data corresponding to the operation of one or more devices of the datacenter based at least in part on the one or more issues. The client modules 130/330/430 receive, via a corresponding CDN server 380/480, the one or more policies from the backend server 390/490, and process data corresponding to the operation of the one or more devices according to the one or more policies.

The logged information and other data from the components of the client modules 130/330/430 is stored in a database 137. The database 137 stores data related to, for example, web services, application services, database services, proxy rules, and accepted and rejected requests. The database 137 also stores datacenter device and/or component inventory, rules and settings for applications, reverse proxy communication and filter history, details of secure upload servers (e.g., links) for periodic log uploads and details of secure catalogs (e.g., links) for periodic upgrading of application versions used by the client module 130/330/430. In configuring the client modules 130/330/430, a user may designate IP ranges and other datacenter device details, which will be added to the inventory for monitoring of operational data and to the rules applied by the reverse proxy layer 133. In one or more embodiments, to save space in the database 137, the client modules 130/330/430 remove older logs and older saved operational data based on, for example, scheduled clean-up tasks and/or rules regarding the age of the logs and the collected operational data.

According to illustrative embodiments, the client module 130/330/430 is installed within the datacenter 110/310 with administrator and/or root access. The CDN servers 380/480 may be a point of contact for the client modules 130/330/430 between the client modules 130/330/430 and the backend servers 390/490. The CDN servers 380/480 can be configured according to local/regional requirements for datacenters 110/310 similarly located. CDN servers 380/480 may accept periodic uploads of the collected operational data from client modules 130/330/430 and send the uploaded data to a backend server 390/490 following the periodic uploads.

In illustrative embodiments, the CDN servers 380/480 are configured to store zone/region level policies for different device types. For example, the SLA for similar warranty levels and/or parts replacement policies might be different in different regions. The CDN servers 380/480 are further configured to collect monitoring and alert processing policies from the backend server 390/490 and forward the monitoring and alert policies to the client modules 130/330/430 periodically or at designated times. As a backend server 390/490 may process a large number of policies, the CDN servers 380/480 are configured to filter policies with regional level support requirements. For example, some device models may not be released in all regions and/or the threshold for support cases and/or parts replacements may be different for different regions.

In illustrative embodiments, the backend servers 390/490 perform the following tasks: (i) receive operational data uploaded from client modules 130/330/430 (via CDN servers 380/380) including, for example, logs and alerts and process the uploaded data; (ii) run machine learning analysis to generate predictions to identify failures, unavailability or other issues with the datacenter devices and/or components; (iii) generate policies and/or rules for processing (e.g., monitoring, collecting and transmitting) operational data of the datacenter devices and/or components based on the machine learning analysis; (iv) passing the policies and/or rules to the client modules 130/330/430 (via CDN servers 380/480) to improve data collection and prevent device unavailability; (v) process alerts and error data received from the client modules 130/330/430 (via CDN servers 380/480) based on warranties and SLAs; and (vi) trigger remedial actions (e.g., parts replacement) for eligible alerts.

According to one or more embodiments, the database 137, storage module 170 and other data repositories or databases referred to herein can be configured according to a relational database management system (RDBMS) (e.g., PostgreSQL). In some embodiments, the database 137, storage module 170 and other data repositories or databases referred to herein are implemented using one or more storage systems or devices associated with the datacenter 110. In some embodiments, one or more of the storage systems utilized to implement the database 137, storage module 170 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The firewall 120, client module 130, network switch 140, storage fabric module 150, servers 160, storage module 170 and one or more elements thereof in the FIG. 1 embodiment are each assumed to be implemented using at least one processing device. Each such processing device generally comprises at least one processor and an associated memory, and implements one or more functional modules for controlling certain features of firewall 120, client module 130, network switch 140, storage fabric module 150, servers 160, storage module 170 and one or more elements thereof.

At least portions of the firewall 120, client module 130, network switch 140, storage fabric module 150, servers 160, storage module 170 and one or more elements thereof may be implemented at least in part in the form of software that is stored in memory and executed by a processor. The firewall 120, client module 130, network switch 140, storage fabric module 150, servers 160, storage module 170 and one or more elements thereof comprise further hardware and software required for running the datacenter 110, including, but not necessarily limited to, on-premises or cloud-based centralized hardware, GPU hardware, virtualization infrastructure software and hardware, Docker containers, networking software and hardware, and cloud infrastructure software and hardware.

It is assumed that the datacenter 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the firewall 120, client module 130, network switch 140, storage fabric module 150, servers 160, storage module 170 and one or more elements thereof can each be implemented in the form of one or more LXCs running on one or more VMs. Other arrangements of one or more processing devices of a processing platform can be used to implement the firewall 120, client module 130, network switch 140, storage fabric module 150, servers 160, storage module 170 and one or more elements thereof. Other portions of the system 100 can similarly be implemented using one or more processing devices of at least one processing platform.

It is to be appreciated that these and other features of illustrative embodiments are presented by way of example only, and should not be construed as limiting in any way. Accordingly, different numbers, types and arrangements of system elements such as the firewall 120, client module 130, network switch 140, storage fabric module 150, servers 160, storage module 170 and one or more elements thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the datacenter 110 can be offered to cloud infrastructure customers or other users as part of FaaS, CaaS and/or PaaS offerings.

Figure 5:
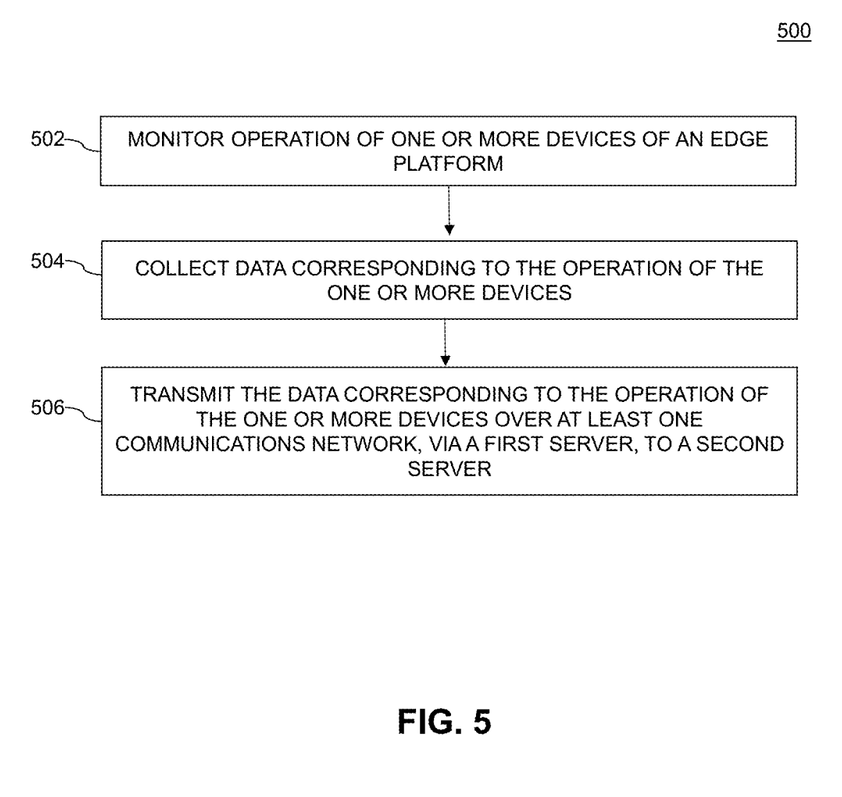
FIG. 5 depicts a process for monitoring operation of edge datacenter devices according to an illustrative embodiment.

The operation of the information processing system 100 will now be described in further detail with reference to the flow diagram of FIG. 5. With reference to FIG. 5, a process 500 for monitoring operation of edge datacenter devices as shown includes steps 502 through 506, and is suitable for use in the system 100 but is more generally applicable to other types of information processing systems comprising a datacenter including a client module configured for monitoring operation of edge datacenter devices.

In step 502, operation of one or more devices of an edge platform (e.g., datacenter 110/310) is monitored. In step 504, data corresponding to the operation of the one or more devices is collected. The monitoring and/or the collecting may be performed using SNMP. For example, an SNMP listener performs the monitoring and/or the collecting.

In step 506, the data corresponding to the operation of the one or more devices is transmitted over at least one communications network, via a first server, to a second server. In illustrative embodiments, the first server comprises a CDN server, and the second server comprises a backend server.

The steps of the method are executed by a processing device operatively coupled to a memory, wherein the processing device is a component of a network switch located in the edge platform. In an illustrative embodiment, the processing device runs a containerized application to execute the steps of the method. For example, the client modules 130/330/430 may comprise the containerized application. The application may be configured to provide one or more reverse proxy functions between a firewall and the one or more devices.

In illustrative embodiments, the data corresponding to the operation of the one or more devices is logged using, for example, logger 136. The logged data is transmitted to the first server (e.g., CDN server) over the communications network. In connection with the operation of the reverse proxy layer 133, one or more data packets corresponding to at least one request for at least one service from the one or more devices are received, and the one or more data packets are scanned to validate the at least one request. The validating comprises determining whether the at least one request complies with one or more reverse proxy rules.

In illustrative embodiments, the monitoring of the operation of the one or more devices comprises tracking network connectivity of the one or more devices. The data corresponding to the operation of the one or more devices comprises one or more notifications regarding an issue with the operation of the one or more devices (received via, for example, SNMP and/or in the form of one or more logs). The data corresponding to the operation of the one or more devices may be retrieved from one or more sensors. The data corresponding to the operation of the one or more devices may comprise changes in one or more performance metrics of the one or more devices.

In illustrative embodiments, the second server (e.g., backend server) uses one or more machine learning algorithms to analyze the data corresponding to the operation of the one or more devices and based at least in part on the analysis, predicts one or more issues with the one or more devices. The second server generates one or more policies regarding processing of the data corresponding to the operation of the one or more devices based at least in part on the one or more issues. The one or more policies are received from the second server via the first server (e.g., CDN server). The data corresponding to the operation of the one or more devices is processed by the client module 130/330/430 according to the one or more policies.

It is to be appreciated that the FIG. 5 process and other features and functionality described above can be adapted for use with other types of information systems configured to monitor operation of edge datacenter devices in a datacenter or other type of platform.

The particular processing operations and other system functionality described in conjunction with the flow diagram of FIG. 5 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with the client module 130/330/430 as disclosed herein can provide a number of significant advantages relative to conventional arrangements. For example, the client module 130/330/430 comprises a lightweight application in a network switch located in a datacenter. The application is configured to monitor operation of edge datacenter devices. The client module 130/330/430 advantageously monitors, collects and transmits to a CDN server operational data of devices and components of a datacenter based on designated policies and rules. The client module 130/330/430 is strategically located in a network switch of datacenter at edge computing site.

As an additional advantage, illustrative embodiments provide a proactive method and self-learning machine model to intelligently evaluate collected operational data and revise and/or update policies for the processing of operational data. As an additional advantage, the illustrative embodiments automatically trigger remedial actions based on identified failures or unavailability of datacenter devices so as to maintain high availability of datacenter services.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the datacenter 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and datacenter in illustrative embodiments. These and other cloud-based systems in illustrative embodiments can include object stores.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
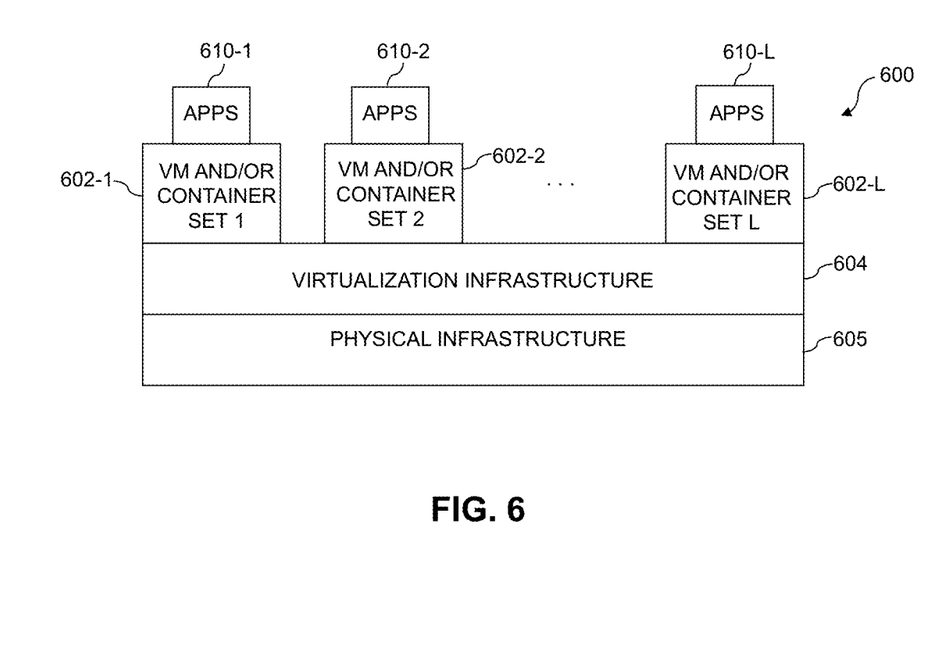
FIGS. 6 and 7 show examples of processing platforms that may be utilized to implement at least a portion of an information processing system according to illustrative embodiments.
Figure 7:
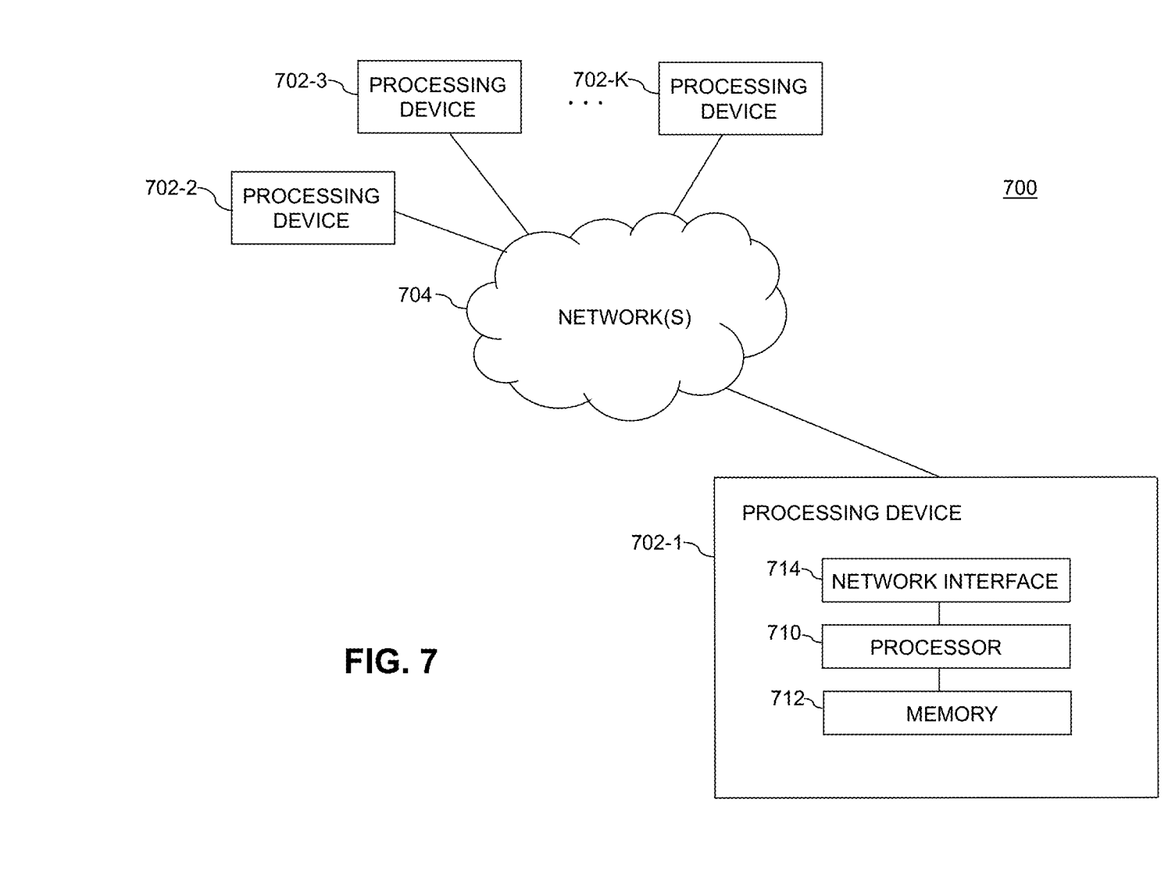

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the datacenter 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and datacenters. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    monitoring operation of one or more devices of an edge platform;
    collecting data corresponding to the operation of the one or more devices; and
    transmitting the data corresponding to the operation of the one or more devices over at least one communications network, via a first server, to a second server;
    wherein the method is executed by a processing device operatively coupled to a memory; and
    wherein the processing device is a component of a network switch located in a datacenter of the edge platform, wherein the one or more devices of the edge platform are located remotely from the datacenter, and wherein the network switch is connected to the one or more devices over the at least one communications network.

2. The method of claim 1 wherein the processing device runs a containerized application to execute the method.

3. The method of claim 1 wherein the processing device runs an application to execute the method, and the application is configured to provide one or more reverse proxy functions between a firewall and the one or more devices.

4. The method of claim 1 wherein the first server comprises a content delivery network server and the second server comprises a backend server.

5. The method of claim 1 wherein at least one of the monitoring and the collecting are performed using simple network management protocol.

6. The method of claim 5 wherein the processing device runs a simple network management protocol listener to perform the at least one of the monitoring and the collecting.

7. The method of claim 1 further comprising:
    logging the data corresponding to the operation of the one or more devices; and
    transmitting the logged data to the first server over the communications network.

8. The method of claim 1 further comprising:
    receiving one or more data packets corresponding to at least one request for at least one service from the one or more devices; and
    scanning the one or more data packets to validate the at least one request;
    wherein the validating comprises determining whether the at least one request complies with one or more reverse proxy rules.

9. The method of claim 1 wherein the monitoring of the operation of the one or more devices comprises tracking network connectivity of the one or more devices.

10. The method of claim 1 wherein the data corresponding to the operation of the one or more devices comprises one or more notifications regarding an issue with the operation of the one or more devices.

11. The method of claim 1 wherein the data corresponding to the operation of the one or more devices is retrieved from one or more sensors.

12. The method of claim 1 wherein the data corresponding to the operation of the one or more devices comprises changes in one or more performance metrics of the one or more devices.

13. The method of claim 1 wherein:
    the second server uses one or more machine learning algorithms to analyze the data corresponding to the operation of the one or more devices and based at least in part on the analysis, predicts one or more issues with the one or more devices; and
    the second server generates one or more policies regarding processing of the data corresponding to the operation of the one or more devices based at least in part on the one or more issues.

14. The method of claim 13 further comprising:
    receiving, via the first server, the one or more policies from the second server; and
    processing the data corresponding to the operation of the one or more devices according to the one or more policies.

15. An apparatus comprising:
    a processing device operatively coupled to a memory and configured:
    to monitor operation of one or more devices of an edge platform;
    to collect data corresponding to the operation of the one or more devices; and
    to transmit the data corresponding to the operation of the one or more devices over at least one communications network, via a first server, to a second server;
    wherein the processing device is a component of a network switch located in a datacenter of the edge platform, wherein the one or more devices of the edge platform are located remotely from the datacenter, and wherein the network switch is connected to the one or more devices over the at least one communications network.

16. The apparatus of claim 15 wherein the processing device runs an application to execute the monitoring, the collecting and the transmitting, and the application is configured to provide one or more reverse proxy functions between a firewall and the one or more devices.

17. The apparatus of claim 15 wherein the processing device is further configured:
    to log the data corresponding to the operation of the one or more devices; and
    to transmit the logged data to the first server over the communications network.

18. An article of manufacture comprising a non-transitory processor-readable storage medium having stored therein program code of one or more software programs, wherein the program code when executed by at least one processing device causes said at least one processing device to:
    monitor operation of one or more devices of an edge platform;
    collect data corresponding to the operation of the one or more devices; and transmit the data corresponding to the operation of the one or more devices over at least one communications network, via a first server, to a second server;

wherein said at least one processing device is a component of a network switch located in a datacenter of the edge platform, wherein the one or more devices of the edge platform are located remotely from the datacenter, and wherein the network switch is connected to the one or more devices over the at least one communications network.

19. The article of manufacture of claim 18 wherein said at least one processing device runs an application configured to provide one or more reverse proxy functions between a firewall and the one or more devices.

20. The article of manufacture of claim 18 wherein the program code further causes said at least one processing device to:

log the data corresponding to the operation of the one or more devices; and transmit the logged data to the first server over the communications network.

\* \* \* \* \*